(12) United States Patent
Schneider (10) Patent No.: US 8,077,862 B2
(45) Date of Patent: Dec. 13, 2011

(54) SHARING A SECRET USING POLYNOMIALS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 866 days.

(21) Appl. No.: 11/978,768

(22) Filed: Oct. 29, 2007

(65) Prior Publication Data

US 2009/0136024 A1    May 28, 2009

(51) Int. Cl.
*H04K 1/00* (2006.01)
*H04L 9/00* (2006.01)

(52) U.S. Cl. .............. 380/28; 380/278; 380/279

(58) Field of Classification Search .......... None
See application file for complete search history.

(56) References Cited

U.S. PATENT DOCUMENTS 4,037,093 A * 7/1977 Gregg et al. ............ 708/492
7,167,565 B2 * 1/2007 Rajasekaran ............ 380/282

OTHER PUBLICATIONS

Wang et al. "Secret image sharing with smaller shadow images"; Pattern Recognition Letters, vol. 27, Issue 6, Apr. 15, 2006, pp. 551-555.*
Shamir, A., "How to Share a Secret", Programming Techniques, Comm. of the ACM, Nov. 1979, vol. 2, No. 11, pp. 612-613.
Blakley, G. et al., "Security of Ramp Schemes", Lecture Notes in Comp. Science, Advances in Cryptology, Proc. of CRYPTO 84, Springer-Verlag, pp. 242-268.
Asmuth, C., et al., "A Modular Approach to Key Safeguarding", IEEE Trans. on Info Theory, vol. IT-29, No. 2, Mar. 1983, pp. 208-210.
Blakley, G.R., "Safeguarding Cryptographic Keys", AFIPS—Conf. Proc., vol. 48, AFIPS Press, Montvale, NJ 07645, pp. 313-317.
Schneier, Bruce, "Applied Cryptography, Second Edition—Protocols, Algorithms and Source Code in C", ©1996, John Wiley & Sons, Inc., title pages, pp. viii and 47-74.

* cited by examiner

*Primary Examiner* — Kaveh Abrishamkar
(74) *Attorney, Agent, or Firm* — Lowenstein Sandler PC (57) ABSTRACT

A method and system for distributing n shares of a secret to n computing systems, and a method and system for reconstructing the secret from k shares of the secret. In one embodiment, the method for distributing the secret comprises representing the secret as a first polynomial over GF(2). The method further comprises creating the n shares from the secret, each of the n shares including a polynomial over GF(2). The secret can be reconstructed, in one embodiment, by solving coefficients of an interpolating polynomial using k points in the k shares using modulo 2 arithmetic.

21 Claims, 4 Drawing Sheets

SECRET SHARING USING POLYNOMIALS

SECRET SHARING USING
POLYNOMIALS

SHARING A SECRET USING POLYNOMIALS

TECHNICAL FIELD

Embodiments of the present invention relate to cryptographic techniques, and more specifically, to sharing secret information among cooperating entities using polynomials.

BACKGROUND

Secret sharing (or threshold secret sharing) is a cryptographic scheme that divides a secret into n pieces (or shares) such that any k of them (k<n) can be used to reconstruct the secret.

Conventional techniques for secret sharing generally use integer mathematics in the calculation of the shares and the reconstruction of the secret from the shares. Adi Shamir discloses a technique that uses polynomial interpolations in the finite field GF(p), where p is a prime number, to construct a threshold secret sharing scheme (A. Shamir, "How to Share a Secret," Communications of the ACM, v. 24, n. 11, November 1979, pp. 612-613). For example, to create a (3, n) threshold scheme (that is, three shares out of n shares are necessary to reconstruct a secret), a quadratic polynomial is generated as $(ax2+bx+M)$ modulo p, where a and b are random numbers, and M is the secret. Each of a, b and M is an integer number. The n shares are obtained by evaluating the polynomial at n distinct non-zero points (each of the n points being an integer number), and the shares are distributed to n cooperating parties. Each of the n shares includes a pair of numbers (x, y), where x is one of the distinct points and y is a corresponding result. To reconstruct the secret, a Lagrange polynomial can be constructed to interpolate the points (x, y) defined by any three shares, and the secret M can be obtained by computing the constant term of the Lagrange polynomial.

Conventional techniques, such as the one described above, perform operations over a field of a prime number, which potentially requires the use of very large integer mathematics. Large integer mathematics can be complex and time-consuming. Thus, there is a need to develop a secret sharing technique that overcomes the above inherent limitations of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein is a method and system for sharing a secret among cooperating entities using polynomials. In one embodiment, the cooperating entities include computing systems that communicate over a network. The secret sharing technique described herein divides the secret into n shares, and distributes one share to each of the computing systems. The shares are created such that the secret can be reconstructed from a subset of the n shares.

One feature of the secret sharing scheme is that the operations for calculating the shares and reconstructing the secret involve polynomial operations over extension fields of GF(2). Polynomial operations over extension fields of GF(2) are well-suited for computer operations, and can be much faster than operations with integers of substantially the same size. In one embodiment, the polynomial operations can be performed as a series of shifts and exclusive OR operations in modulo 2 arithmetic.

In one embodiment, the secret to be shared is represented as one or more bit strings, or equivalently, one or more polynomials over GF(2). A plurality of shares are created from the secret, each of the shares including a polynomial over GF(2). Generating the shares involves choosing a primitive polynomial of degree m over GF(2), and constructing a sharing polynomial over $GF(2^m)$, where m is at least as large as the effective length of the secret represented as a binary bit string. If the secret is used as one of the coefficients of the sharing polynomial (e.g., the constant term), the "effective length" of the secret refers to the total number of bits in the secret. However, if the secret is split into multiple segments over multiple or the entire set of the coefficients, the "effective length" of the secret refers to the number of bits in each segment of the secret. In the latter scenario where the secret is split into multiple segments, each segment of the secret represents a polynomial over GF(2).

To create n shares from the secret, the sharing polynomial is evaluated at n distinct and non-zero evaluation points, modulo the primitive polynomial. Each evaluation point represents a polynomial over GF(2). Each share includes one of the evaluation points and the corresponding evaluated result. To recover the secret, any k shares out of the n shares can be used to compute the coefficients of the sharing polynomial using the k evaluation points and the corresponding k evaluated results. The secret is then recovered as one or more of the coefficients of an interpolating polynomial computed from the k shares.

The primitive polynomial used in the secret sharing scheme described herein is a primitive polynomial over a finite field GF(2). In general, a primitive polynomial over a finite field GF(q) is defined as a polynomial irreducible over GF(q) and with all of its coefficients from GF(q). Additionally, all roots of the polynomial in $GF(q^n)$ (where n is the degree of the polynomial) are primitive in $GF(q^n)$. A polynomial is irreducible over GF(q) if it has no roots in GF(q). The value q, which is the order of the finite field, can be any prime number or any power of a prime number. In one embodiment, q is equal to 2, which means that the coefficients of the primitive polynomial are either 0 or 1. However, other values of q can be used in alternative embodiments. The roots of a primitive polynomial over GF(q) of degree n generate the field $GF(q^n)$. Thus, the primitive polynomial can be used to construct a representation of the field. In the case of GF(2), the construction takes the form of bit strings of length n, which represent polynomials over GF(2), and, equivalently, elements of $GF(2^n)$ in what is known as the "polynomial basis." As it turns out, the polynomial basis is convenient for performing multiplication and addition of elements of $GF(2^n)$, since addition is a bitwise XOR and multiplication can be implemented as a series of shifts and XORs. Division by the primitive polynomial can also be implemented as a series of shifts and XORs.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "representing", "distributing", "generating", "constructing", "evaluating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
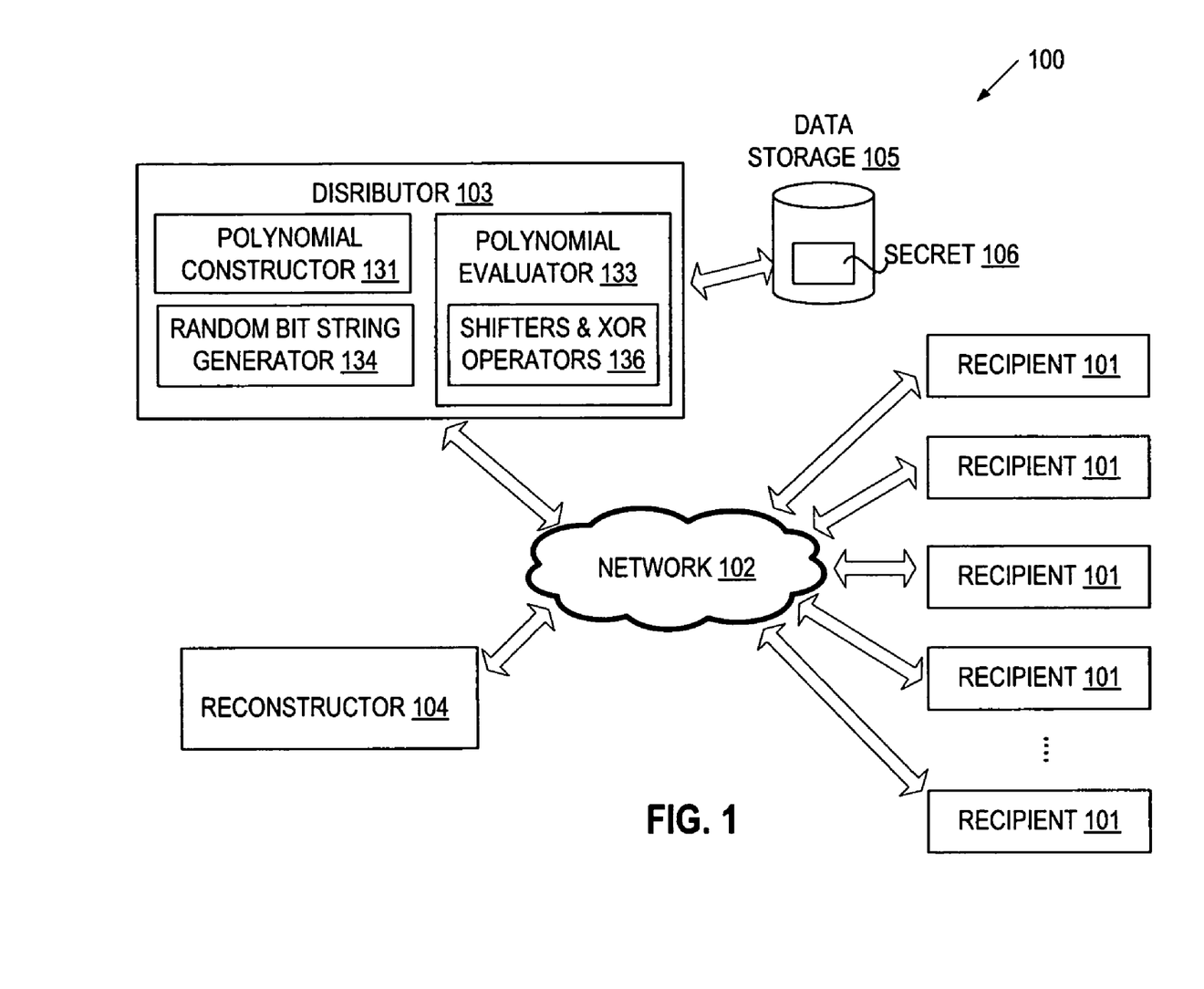
FIG. 1 illustrates a network architecture in which embodiments of the present invention may be implemented.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a local area Network (LAN)). In one embodiment, each of the distributor 103 and recipients 101 is a computing system that manages secret information. The distributor 103 is locally coupled to data storage 105 in which a secret 106 is stored. In alternative embodiments, the secret 106 may be stored in the main memory of the distributor 103. The secret 106 may be any information that can be expressed as a bit string, or equivalently, a polynomial over GF(2). In one embodiment, the secret 106 is a cryptographic key to be jointly held in escrow by the recipients 101. Each share of the secret 106 may be distributed to the recipients 101 via the network 102, on physical storage media (e.g., disks, flash drives, etc.) or other suitable machine-accessible storage media as described above.

To safeguard the secret 106, the distributor 103 generates a plurality of shares of the secret 106 and distributes one share to each of the recipients 101. The secret 106 can be reconstructed from a subset of the distributed shares. In one embodiment, the cryptosystem 100 also includes a reconstructor 104 to reconstruct the secret 106 using the distributed shares. A person skilled in the art would appreciate that the reconstructor 104 may be a separate computing system as shown in FIG. 1, or, alternatively, reside in the same computing system as the distributor 103 or any of the recipients 101. The distributor 103, the recipients 101 and the reconstructor 104 may be, for example, servers, personal computers (PCs), mobile phones, palm-sized computing devices, personal digital assistants (PDAs), or the like.

In one embodiment, the distributor 103 includes a polynomial constructor 131 to construct a sharing polynomial based on the secret 106. The distributor 103 also includes a polynomial evaluator 133 to evaluate the sharing polynomial at n random points, modulo a primitive polynomial. A random bit string generator 134 is used to generate the n random points and coefficients of the sharing polynomial. Shifters and exclusive OR (XOR) operators 136 are used to compute polynomial operations (e.g., addition, subtraction, multiplication and division) involved in the polynomial evaluation. The reconstructor 104 constructs an interpolating polynomial to interpolate the points in the distributed shares and solves for the secret 106. Operations performed by the distributor 103 and the reconstructor 104 according to some embodiments of the invention will be described in greater detail below in connection with FIG. 2 and FIG. 3.

Figure 2:
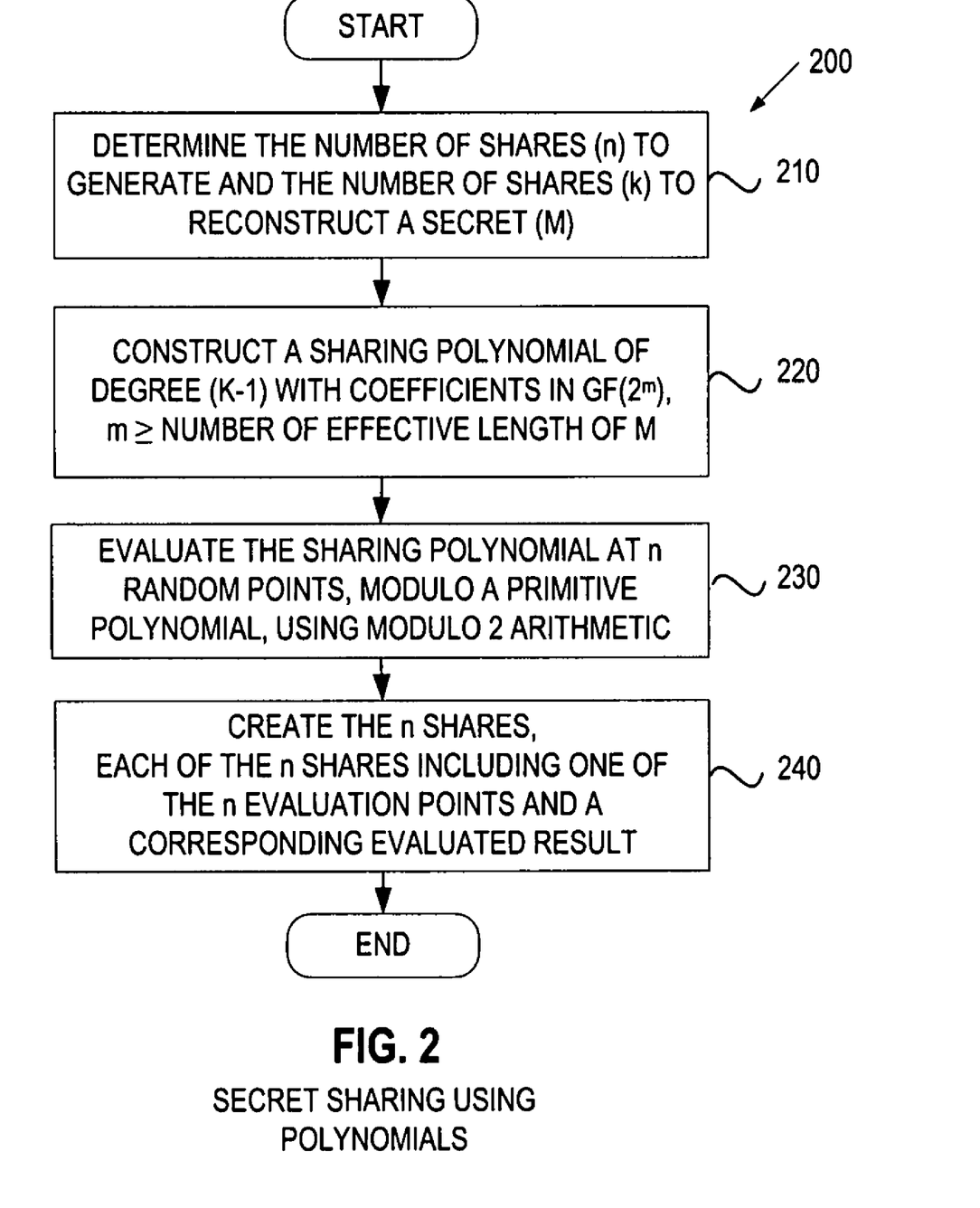
FIG. 2 is a flow diagram showing one embodiment of a secret sharing process.

FIG. 2 illustrates a flow diagram of one embodiment of a process 200 for generating a plurality of shares from a secret (e.g., the secret 106). The process 200 may be performed by the processing logic 426 of FIG. 4 that may comprise hardware (e.g., circuitry, dedicated logic, programmable logic, microcode, etc.), software (such as instructions run on a processing device), or a combination thereof. In one embodiment, the process 200 is performed by the distributor 103 of FIG. 1.

Referring to FIG. 2, at block 210, the process 200 begins with the processing logic 426 determining the number of shares (n) to generate and the number of shares (k) necessary for secret reconstruction. At block 220, a sharing polynomial of degree (k−1) is constructed with coefficients being elements of $GF(2^m)$, where m is at least as large as the effective length of the secret (M). In one embodiment, the constant term of the random polynomial is chosen to be M, which is the secret represented as a bit string, or equivalently, a polynomial over GF(2). For example, in an embodiment where k=3, the random polynomial can be represented as $Ax^2+Bx+M$, where A and B are random bit strings of length m. In an alternative embodiment, the bit string of the secret can be spread over multiple or the entire set of the coefficients of the sharing polynomial. For example, the secret 00010010 in a (2, 3) scheme can be used to construct a sharing polynomial as (0001x+0010). The effective length of the secret m, in this alternative embodiment, is equal to 4. Thus, the alternative embodiment has the advantage of using a smaller primitive polynomial and a smaller field, which results in faster operations.

Continuing the process 200 at block 230, the sharing polynomial is evaluated at n evaluation points, followed by a modulo operation of a primitive polynomial over GF(2) of degree m. In one embodiment, the primitive polynomial is known to the distributor 103 and the reconstructor 104 prior to the process 200. The evaluation and modulo operations can be performed as a series of shifts and XOR operations, which are carried out in modulo 2 arithmetic.

At block 240, the n shares of the secret are created, with each share including one of the evaluation points and a corresponding evaluated result. In some embodiments, each share may also include the parameter k (representing the number of shares necessary for reconstructing the secret) and/or the bit string representing the primitive polynomial, if the distributor 103 and the reconstructor 104 have not established these parameters prior to the process 200.

Figure 3:
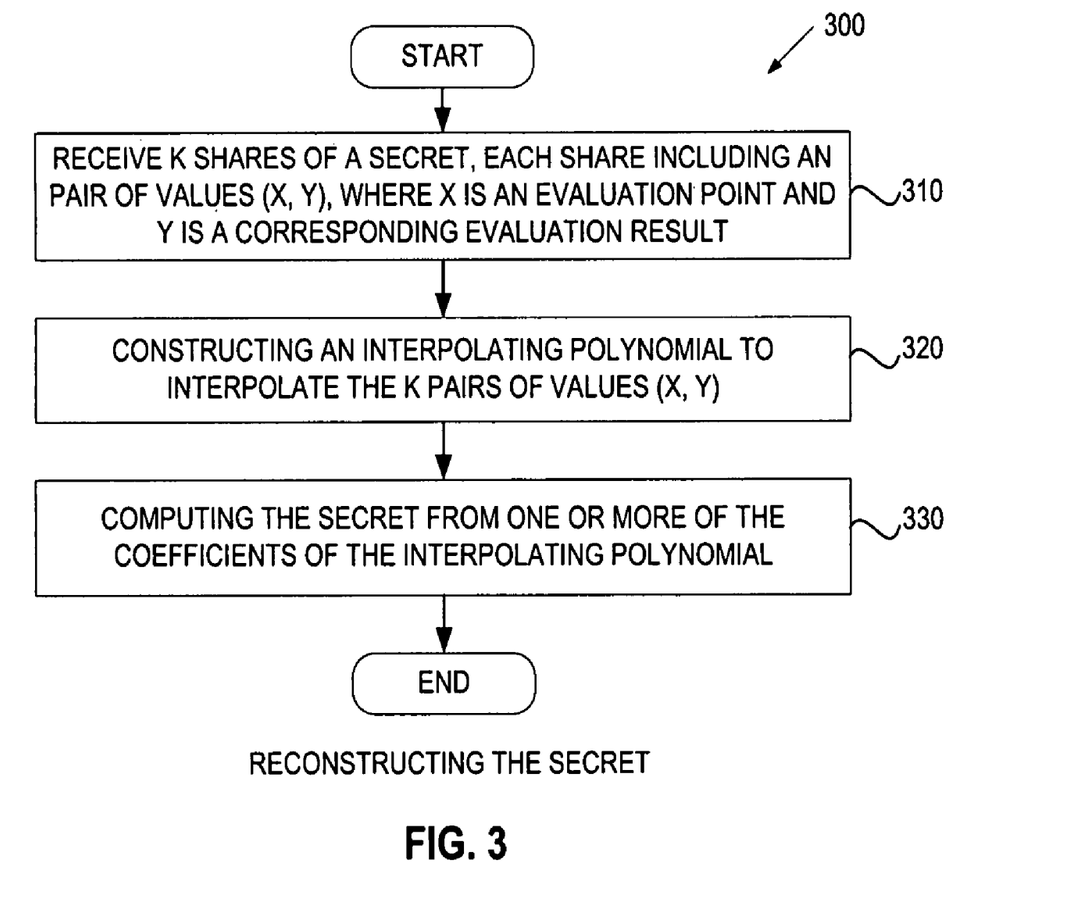
FIG. 3 is a flow diagram showing one embodiment of a secret reconstruction process.

FIG. 3 illustrates a flow diagram of one embodiment of a process 300 for reconstructing the secret from k shares. The process 300 may be performed by the processing logic 426 of FIG. 4 that may comprise hardware (e.g., circuitry, dedicated logic, programmable logic, microcode, etc.), software (such as instructions run on a processing device), or a combination thereof. In one embodiment, the process 300 is performed by the reconstructor 104 of FIG. 1.

Referring to FIG. 3, at block 310, the process 300 begins with the processing logic 426 receiving k shares of the secret, each of the k shares including a pair of values (x, y), where x is an evaluation point and y is a corresponding evaluation result, as described above with reference to FIG. 2. At block 320, an interpolating polynomial (e.g., a Lagrange polynomial) is constructed to interpolate the k pairs of (x, y). An example of constructing the Lagrange polynomial using the evaluation points and the corresponding evaluation results is provided in the following paragraph. Prior to the secret distribution and reconstruction, the distributor 103 and the reconstructor 104 have agreed that the secret is to be used as one or more of the coefficients of the sharing polynomial (which takes the form of an interpolating polynomial at the reconstructor 104). At block 330, the reconstructor 104 computes the one or more of the coefficients of the interpolating polynomial to obtain the secret.

It is understood that the interpolation of the points described above can be performed by alternative techniques, such as Newton polynomials, Chebyshev polynomials, Berstein polynomials, a system of linear equations, or other techniques commonly known in the field of numerical analysis. The interpolating polynomial is a polynomial over $GF(2^m)$. Thus, the construction of the interpolating polynomial can be performed with a series of shifts and XOR operations in modulo 2 arithmetic.

The following example illustrates an embodiment of the secret sharing technique using polynomials over GF(2). Assume that the secret M to be distributed is 18, which can be represented as a bit string 00010010 of 8 bits, or equivalently, $x^4+x$, which is a polynomial over GF(2). A parameter m, which is at least as large as the effective length of the secret, is chosen to be 8. Further, assume that a (2, 3) scheme is used to distribute the secret, which means that a total of three shares are generated, and any two of the three shares are needed for secret reconstruction. A sharing polynomial Ax+B is generated, where A and B are elements of $GF(2^8)$, e.g., 8-bit quantities. In this example, assume that B is equal to M (the secret), and A is a randomly-selected bit string quantity 10100011. The primitive polynomial for generating the shares is over GF(2) of degree m, e.g., $x^8+x^4+x^3+x^2+1$, which can be represented as a bit string 100011101. To create the three shares, the expression (Ax+M) is evaluated at three evaluation points, modulo $(x^8+x^4+x^3+x^2+1)$ Each of the evaluation points is a random element of $GF(2^8)$. For example, the three random points can be chosen as three random 8-bit quantities (00000001, 00000010, and 00000011). Representing every quantity as a bit string, the expression (Ax+M) modulo $(x^8+x^4+x^3+x^2+1)$ can be rewritten as (10100011)x+(00010010) (modulo 100011101). As each of the bit strings represents a polynomial over GF(2), evaluating this expression at the three random points chosen above involves polynomial multiplications, divisions, and additions in GF(2), which can be carried out as a series of shifts and XOR operations in modulo 2 arithmetic. For example, (10100011)x, where x is equal to (00000011), represents a multiplication of $(x^7+x^5+x+1)$ by (x+1) in GF(2), which can be computed as a series of shifts and bit-wise XOR of (10100011) and (00000011).

Continuing the above example, the three shares can be generated with the following operations:

Evaluating at 00000001:
10100011(00000001)+00010010=10100011+
00010010=10110001      (Equation 1), Evaluating at 00000010:
10100011(00000010)+00010010=101000110+
00010010=01011011+00010010=01001001      (Equation 2), Evaluating at 00000011:
10100011(00000011)+00010010=111100101+
00010010=11111000+00010010=11101010      (Equation 3).

In Equations 2 and 3, the multiplications produce 9-bit quantities 101000110 and 111100101, which may be reduced to 8 bits before adding to the 8-bit quantity 00010010. The bit reduction may be performed by taking the 9-bit quantity modulo the primitive polynomial, which can be calculated by taking the XOR of 9-bit quantity (e.g., 101000110) and the bit string representation of the primitive polynomial 100011101, and dropping the leading zero in the XOR result to obtain 01011011. Although not explicitly shown, it is understood that the use of the primitive polynomial in Equations 1-3 is implicit.

Thus, the three shares in this example are:

($x_0$=00000001, $y_0$=10110001, f=100011101, k=2), ($x_1$=00000010, $y_1$=01001001, f=100011101, k=2), ($x_2$=00000011, $y_2$=11101010, f=100011101, k=2).

The terms f=100011101 and k=2 may be omitted from the shares if these quantities are known to both the distributor 103 and the reconstructor 104 by some other means.

To reconstruct the secret from any two of the shares, e.g., the first two shares ($x_0$=00000001, $y_0$=10110001), ($x_1$=00000010, $y_1$=01001001), a polynomial of the Lagrange form can be constructed by first constructing two Lagrange bases using the two shares:

$$L_0(x)=(x-x_1)/(x_0-x_1)=11110100x+ \\ 111101000=11110100x+11110101,$$

$$L_1(x)=(x-x_0)/(x_1-x_0)=(x+00000001)(11110100) \\ =11110100x+11110100,$$

$$y_0L_0(x)=(11110100x+11110101)(10110001) \\ =110101100110100x+ \\ 110101110000101=1101111x+11101110 \quad \text{(Equation 4)},$$

$$y_1L_1(x)=(11110100x+11110100)(01001001) \\ =11101001010100x+ \\ 1101001010100=11001100x+11001100 \quad \text{(Equation 5)},$$

$y_0L_0(x)+y_1L_1(x)=10100011x+00010010$, where the constant term 00010010 is the secret.

Similar to the share distribution process, the use of the primitive polynomial is implicit in the above reconstruction calculations. For example, in Equations 4 and 5, the primitive polynomial is used to reduce the excess bits in 110101100110100, 110101110000101, 11101001010100 and 11101001010100 to 8-bit quantities, by carrying out modulo operations in a series of shifts and XOR operations. In the scenario that the constant term is the secret, the computations above can be further simplified. Instead of computing both coefficients of the Lagrange polynomial, the multiplicative inverse of ($x_0-x_1$) and ($x_1-x_0$), modulo 100011101 can be computed as H and J, respectively. The constant term can then be calculated as $Hx_1y_0+Jx_0y_1$, modulo 100011101. In alternative embodiments where the secret is spread over more than one coefficient, the computations can be performed for those coefficients necessary for recovering the secret.

Alternatively, in the above example, the secret can be reconstructed from a set of two linear equations with two unknowns A and M (where M is the secret):

$$x_0A+M=y_0 \text{(modulo 100011101), and}$$

$$x_1A+M=y_1 \text{(modulo 100011101)}.$$

Using polynomial operations, which can be carried out as a series of shifts and XOR operations in modulo 2 arithmetic, the secret M can be solved. In the above example, it is understood that the bit strings are chosen to be short for simplicity of illustration and a bit string for practical use may be hundreds or thousands of bits long.

Figure 4:
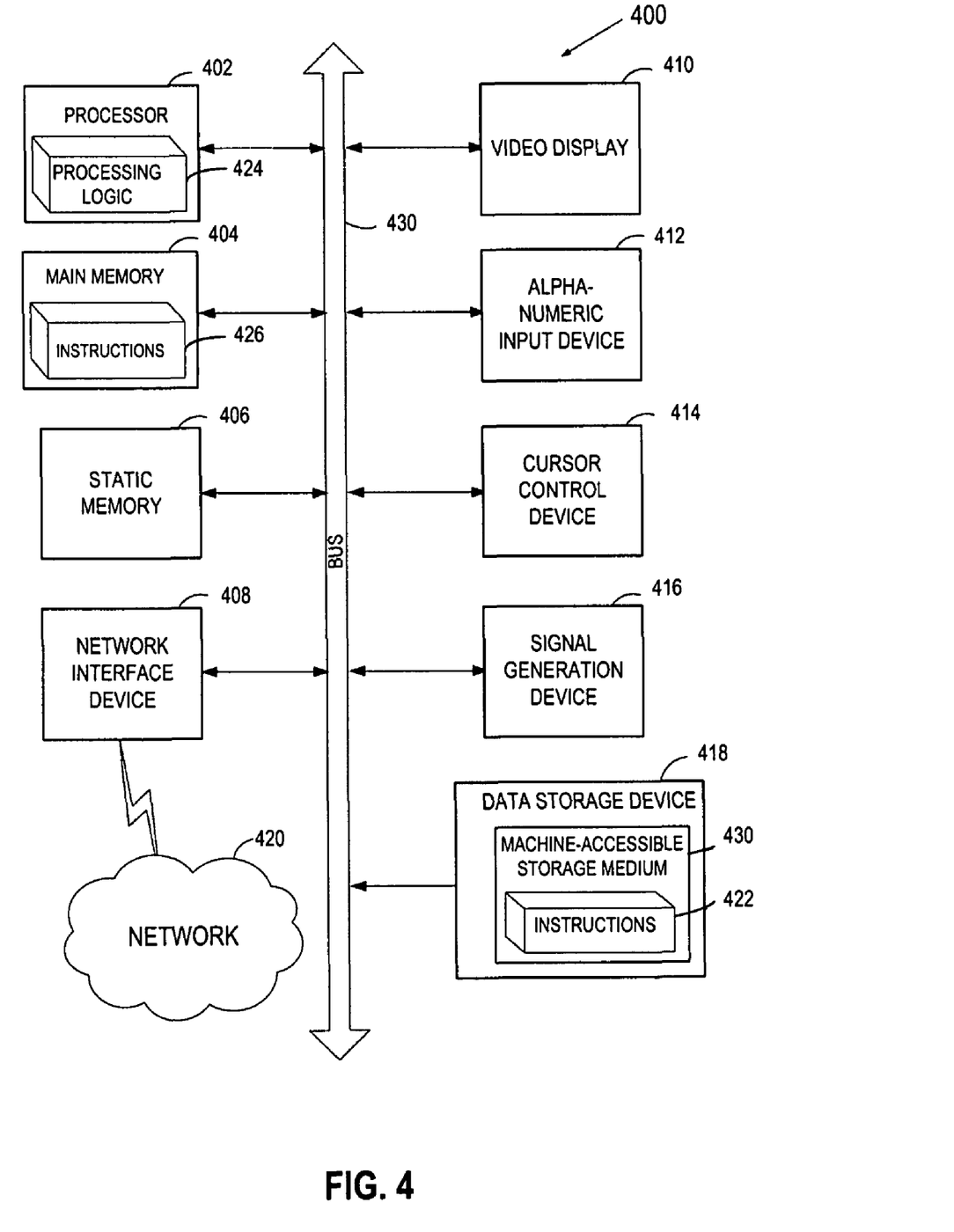
FIG. 4 illustrates a block diagram of an exemplary computer system implementing some embodiments of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. Processing device 402 may also be one or more special-purpose processing devices, such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store the secret 106 of FIG. 1. While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and system for sharing a secret using polynomials have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, implemented by a computing device programmed to perform the following, the method comprising:
obtaining, by the computing device, a cryptographic key as a secret represented as a first polynomial over GF(2), wherein the cryptographic key is used to encrypt or decrypt data;
constructing, by the computing device, a sharing polynomial with coefficients in $GF(2^m)$, m being at least as large as an effective length of the secret, one or more of the coefficients being the secret;
evaluating, by the computing device, the sharing polynomial modulo a primitive polynomial of degree m at n random points, using polynomial operations and modulo 2 arithmetic to generate n shares, each of the n shares comprising one of the random points expressed as a random bit string in $GF(2^m)$ and a corresponding evaluated result; and
distributing, by the computing device, the n shares to n cooperating computing devices.

2. The method as recited in claim 1, further comprising: establishing the primitive polynomial between the computing device and a reconstructor for reconstructing the secret prior to distribution of the secret.

3. The method as recited in claim 1, wherein each of the n shares comprises the primitive polynomial represented as a binary bit string of length m.

4. The method as recited in claim 1, further comprising creating the n shares by performing polynomial multiplications and polynomial divisions using a series of shifts and exclusive OR operations.

5. The method as recited in claim 1, wherein the secret is a constant term of a sharing polynomial of degree (k−1), k being the number of shares necessary to reconstruct the secret.

6. The method as recited in claim 1, wherein the secret is spread over coefficients of a sharing polynomial of degree (k−1), k being the number of shares necessary to reconstruct the secret.

7. A system comprising:
non-transitory data storage to store a cryptographic key as secret, wherein the cryptographic key is used to encrypt or decrypt data; and
a distributor computing system coupled to the data storage, the distributor computing system comprising:
a processing device;
a polynomial constructor, executed by the processing device, to construct a sharing polynomial with coefficients in $GF(2^m)$, m being at least as large as an effective length of the secret, one or more of the coefficients being the secret; and
a polynomial evaluator, executed by the processing device, to evaluate, at n random points, the sharing polynomial modulo a primitive polynomial of degree m using polynomial operations and modulo 2 arithmetic, and to create n shares of the secret, with each of the n shares comprising one of the random points expressed as a random bit string in $GF(2^m)$ and a corresponding evaluated result.

8. The system as recited in claim 7, wherein the secret is split into multiple segments and spread over multiple coefficients of the sharing polynomial, the effective length of the secret being the number of bits in each of the segments.

9. The system as recited in claim 7, wherein the polynomial evaluator further comprises:
shifters and exclusive OR operators to perform polynomial multiplications and polynomial divisions.

10. The system as recited in claim 7, wherein the primitive polynomial is represented as a binary bit string of length m.

11. A non-transitory computer readable storage medium including instructions that, when executed by a processing system, cause the processing system to perform a method comprising:
obtaining a cryptographic key as a secret represented as a first polynomial over GF(2), wherein the cryptographic key is used to encrypt or decrypt data;
constructing a sharing polynomial with coefficients in $GF(2^m)$, m being at least as large as an effective length of the secret, one or more of the coefficients being the secret;
evaluating the sharing polynomial modulo a primitive polynomial of degree m at n random points, using polynomial operations and modulo 2 arithmetic to generate n shares, each of the n shares comprising one of the random points expressed as a random bit string in $GF(2^m)$ and a corresponding evaluated result; and
distributing the n shares to n cooperating computing systems.

12. The computer readable storage medium of claim 11, wherein the method further comprises:
establishing the primitive polynomial between the processing system and a reconstructor for reconstructing the secret prior to distribution of the secret.

13. The computer readable storage medium of claim 11, wherein each of the n shares comprises the primitive polynomial represented as a binary bit string of length m.

14. The computer readable storage medium of claim 11, wherein the method further comprises:
creating the n shares by performing polynomial multiplications and polynomial divisions using a series of shifts and exclusive OR operations.

15. A method, implemented by a computing device programmed to perform the following, the method comprising:
obtaining, by the computing device, k shares of a cryptographic key as a secret, each of the k shares comprising a pair of elements in $GF(2^m)$, m being at least as large as an effective length of the secret, wherein the cryptographic key is used to encrypt or decrypt data;
constructing, by the computing device, an interpolating polynomial to interpolate the pairs of elements in the k shares;
computing, by the computing device, one or more of coefficients of the interpolating polynomial with polynomial operations modulo a primitive polynomial of degree m, using modulo 2 arithmetic; and
recovering, by the computing device, the secret from the one or more of coefficients of the interpolating polynomial, the secret represented as a polynomial over GF(2).

16. The method as recited in claim 15, wherein the secret is a constant term of the interpolating polynomial.

17. The method as recited in claim 15, wherein the interpolating polynomial is a Lagrange polynomial.

18. The method as recited in claim 15, wherein the secret is split into multiple segments and spread over multiple coefficients of the interpolating polynomial, the effective length of the secret being the number of bits in each of the segments.

19. A non-transitory computer readable storage medium including instructions that, when executed by a processing system, cause the processing system to perform a method comprising:

obtaining k shares of a cryptographic key as a secret, each of the k shares comprising a pair of elements in $GF(2^m)$, m being at least as large as an effective length of the secret, wherein the cryptographic key is used to encrypt or decrypt data;

constructing an interpolating polynomial using the pairs of elements in the k shares;

computing one or more of coefficients of the interpolating polynomial with polynomial operations modulo a primitive polynomial of degree m, using modulo 2 arithmetic; and recovering the secret from the one or more of the coefficients, the secret represented as a polynomial over $GF(2)$.

20. The non-transitory computer readable storage medium of claim 19, wherein solving coefficients of a first polynomial further comprises:

substituting each pair of elements into (x, y) variables of the interpolating polynomial to generate a system of linear equations; and solving the system of linear equations to obtain the secret.

21. The non-transitory computer readable storage medium of claim 19, wherein the interpolating polynomial is a Lagrange polynomial that interpolates the pairs of elements in the k shares.

* * * * *